United States Patent
Johnson

Patent Number: 6,073,445
Date of Patent: Jun. 13, 2000

[54] METHODS FOR PRODUCING HYDRO-ELECTRIC POWER

[76] Inventor: Arthur Johnson, 240 Fox Dr., Boulder, Colo. 80303

[21] Appl. No.: 09/281,211

[22] Filed: Mar. 30, 1999

[51] Int. Cl.[7] .................................................. F01B 29/00
[52] U.S. Cl. ........................ 60/512; 415/202; 416/197 B
[58] Field of Search .............................. 60/508, 512, 595; 417/374, 380, 381; 415/202; 416/197 B

[56] References Cited

U.S. PATENT DOCUMENTS

| | | | |
|---|---|---|---|
| 4,097,217 | 6/1978 | Keller | 431/11 |
| 4,269,565 | 5/1981 | Charles et al. | 416/197 B X |
| 4,515,095 | 5/1985 | Greskovich | 110/347 |
| 4,537,606 | 8/1985 | Itoh et al. | 55/158 |
| 4,596,198 | 6/1986 | Greskovich et al. | 110/347 |
| 4,761,132 | 8/1988 | Khinkis | 431/10 |
| 4,856,985 | 8/1989 | Ochel et al. | 431/202 |
| 4,899,670 | 2/1990 | Hansel | 110/264 |
| 4,936,874 | 6/1990 | Eriksson et al. | 48/203 |
| 4,957,050 | 9/1990 | Ho | 110/346 |
| 5,048,433 | 9/1991 | Green et al. | 110/260 |
| 5,117,800 | 6/1992 | Watson et al. | 123/575 |
| 5,203,859 | 4/1993 | Khinkis et al. | 432/30 |
| 5,302,112 | 4/1994 | Nabors, Jr. et al. | 431/8 |
| 5,413,476 | 5/1995 | Baukal, Jr. et al. | 431/10 |
| 5,579,640 | 12/1996 | Gray, Jr. et al. | 91/4 R X |
| 5,590,519 | 1/1997 | Almlöf et al. | 60/39.33 |
| 5,647,734 | 7/1997 | Milleron | 417/380 |
| 5,702,238 | 12/1997 | Simmons et al. | 417/380 |
| 5,755,553 | 5/1998 | Laemthongsawad | 415/202 X |
| 5,894,730 | 4/1999 | Mitchell | 60/595 |

*Primary Examiner*—Hoang Nguyen
*Attorney, Agent, or Firm*—Pennie & Edmonds LLP

[57] ABSTRACT

A process for producing power by displacing water from a tank for operating a hydro-electric apparatus such as a turbine or Pelton wheel. In one embodiment, combustion products from fossil fuels are utilized to displace water from a reservoir or tank. The combustion products are generated by burning a fuel in a gas that contains more than 25% by volume oxygen to generate a hotter flame and less pollutants. If desired, the fuel and gas can be combusted in the reservoir or tank. In another embodiment, differences in pressure can be used to displace water from a reservoir to the hydro-electric apparatus. With these processes, hydro-electric power can be generated at greatly increased efficiencies compared to the prior art.

20 Claims, 2 Drawing Sheets

METHODS FOR PRODUCING HYDRO-ELECTRIC POWER

TECHNICAL FIELD

The present invention relates to the production of hydro-electric power. More particularly, the present invention relates to the production of hydro-electric power through the combustion of fossil fuels such as coal or natural gas in the presence of an oxygen rich gas. Hydro-electric power is generated by directing water from a reservoir to drive a Pelton wheel to generate electricity before returning the water to the reservoir. The combustion products can be used to displace the water to the Pelton wheel. Alternatively, the Pelton wheel can be placed in a location that is reduced in pressure compared to the reservoir to assist in displacing the water to the Pelton wheel.

BACKGROUND OF THE INVENTION

In order to produce electricity on a commercial scale, it is generally accepted that a rotating motor generator is necessary to rotate magnets around coils of wire. A generator is commonly rotated by impinging a gas such as steam against a wheel. A steam generator of this conventional type will only have an efficiency of about 35 to 40 percent. Thus, steam driven electric generators result in a substantial waste of fossil fuels. No system has been developed to correct this enormous inefficiency and waste of fossil fuel resources which, of course, cannot be replaced.

Many patents have been directed to the production of power utilizing steam or water to rotate a wheel which in turn rotates the magnets around the coils of wire. My U.S. Pat. Nos. 5,461,858 and 5,551,237 disclose that steam or water vapor can be used to displace water in a series of tanks with the displaced water used to rotate a turbine wheel to generate electricity. Also, my U.S. Patent No. 5,713,202 discloses that fossil fuel can be burned in a tank to displace water for this purpose.

Most of the heat in existing coal fired boilers is transmitted to boiler tubes by radiation in order to generate steam. Many patents have been directed to produce power from steam more efficiently, but all have lacked the simplicity of both design and construction to be adapted for safe use in modern power plants. The present invention provides more efficient power production in relatively simple designs.

SUMMARY OF THE INVENTION

The present invention overcomes the problems in the prior art through a unique process that allows the production of hydro-electric power at greatly increased efficiency than was previously possible. In a first embodiment, hydro-electric power is produced from the use of combustion products of hydrocarbon fuels through a method that can be adapted to existing power plants. This method includes the steps of burning a fossil fuel in the presence of a gas that contains at least 25% oxygen by volume to generate combustion products and higher temperatures compared to fuel burned in the presence of air, utilizing the combustion products to displace water from a reservoir and cause it to exit the reservoir, and directing the water exiting the reservoir to a hydro-electric apparatus for operation of the same to generate power. In addition, the higher temperature combustion products can be used to create additional or higher temperature steam in existing power plant boilers.

The reservoir which may be a first tank that includes a movable plate therein which plate displaces the water when the combustion products are introduced into or generated in the tank. The gas preferably contains at least 30% oxygen so as to increase the oxygen/nitrogen ratio to at least about 43%. Although pure oxygen can be used in this process, it is more economical to use oxygen/nitrogen mixtures containing about 35 to 80% oxygen.

The water may exit the tank through an aperture which has a relatively small area compared to the cross-sectional area of the tank. Specifically, the area of the tank should be between 20 and 50 times the area of the aperture for optimum performance. Also, the exiting water may be directed to a reservoir prior to directing the water to the hydro-electric apparatus. A preferred hydro-electric apparatus comprises a Pelton wheel which is rotated to generate electricity. If desired, the hydro-electric apparatus can produce direct current for charging one or more batteries.

If desired, a second tank can be used in the same manner as the first tank so that one tank can be refilled with water while the other is releasing water. Each tank may include a movable plate therein for displacing the water. One tank may be smaller than the other tank so that it can be advantageously placed inside of the other tank to reduce operating costs. The water which exits the hydro-electric apparatus can be recycled back to one of the tanks. When two tanks are used, the recycled water can be directed back to one of the tanks while the other is displacing water for the most efficient operation of the process.

The water in the tank or tanks can be treated to facilitate operation of the process. For example, alkaline material can be added to the water to offset acidic components from the combustion products and reduce corrosion of the hydro-electric apparatus. Also, corrosion inhibitors can be added to the water to prevent corrosive attack on the metal components of the hydro-electric apparatus.

The fossil fuel to be combusted can include any source of hydrocarbon materials, such as coal, oil or natural gas with the latter being preferred. If desired, a mixture of the oxygen rich gas and a fossil fuel can be introduced into a first tank which is substantially full of water and combusted therein to displace the water.

The fuel should be used in the gaseous state, with natural gas being preferred. A convenient source of oxygen is air, and copper or brass screens can be utilized to prevent burning of the fuel and air before the mixture enters the tank. Advantageously, the fuel, air or fuel/air mixture can be heated before entering the tank to facilitate combustion thereof. Thus, the tank should be insulated to retain heat therein for warming one or more of the fuel, air, fuel/air mixture or water therein.

The water in the tank is generally heated by combustion of the fuel/oxygen mixture therein to reduce its viscosity and increase the efficiency of operation of the hydro-electric apparatus. The efficiency of water impingement in the hydro-electric generator of the present invention is on the order of 70 to 90 percent, as opposed to only 35 or 40 percent that is achieved with utilizing steam impingement.

In another embodiment, the invention relates to a process for generating hyrro-electric power by decreasing pressure within a housing that contains a hyrro-electric power generating apparatus, utilizing the difference in pressure between the housing and a water reservoir to cause the water to exit the reservoir and enter the housing, and then directing water which enters the housing to the hyrro-electric apparatus for operation of same to create hyrro-electric power. As above, a suitable apparatus is a Pelton wheel.

Preferably, the water exits the reservoir through an aperture which has a relatively small cross-sectional area compared to the cross-sectional area of the reservoir. This water can then enter the housing by passing through a preferred arrangement of two successive sliding doors which alternatively slide open and closed in order to allow passage of water into the housing while preserving the reduced pressure condition in the housing. Generally, one of the doors will remain closed while the other is partially or fully open.

The water exiting the hyrro-electric apparatus is directed back into the reservoir, thus obtaining a closed system. Appropriate water treatment additives can be included to prevent growth of microorganisms or other matter which could cause operational problems. To facilitate return of the water to the reservoir, the housing for the hyrro-electric apparatus can be located at a higher elevation than the reservoir. Also, in a preferred arrangement, the water that is directed back to the tank may pass through two successive sliding doors to preserve the reduced pressure in the housing. The reduced pressure in the housing can be created by withdrawing air from evacuating the housing using a vacuum producing device or a compressor.

BRIEF DESCRIPTION OF THE DRAWINGS

The invention may be better understood with reference to the appended drawing figures wherein.

DETAILED DESCRIPTION OF THE PREFERRED EMBODIMENT

In one aspect of the present invention, it was found that the radiated heat produced by combusting hydrocarbon fuels can be enhanced by burning such fuels in the presence of an oxygen rich gas. In doing this, both the flame temperature and temperature of the combustion products will be increased, so that the amount of heat energy radiated upon the boiler tubes is increased. Thus, greater amounts of steam or higher pressures of steam can be generated in existing equipment. In addition, the burning of the fuel is accomplished in a more efficient manner, and both the volume of flue gas produced, as well as the amount of air pollutants in the flue gas, are significantly reduced.

By "oxygen rich gas" what is meant is a gas or gaseous mixture that contains at least 25% by volume of oxygen. Atmospheric air as currently utilized by the prior art is insufficient for use in the present invention because it contains only about 20% oxygen. Although pure oxygen gas can be used, it is expected that a mixture of air and oxygen, which mixture has an oxygen content of at least 25% by volume, and preferably between about 35 to 80% by volume, will be highly advantageous in providing enhanced flame temperatures, greater BTUs and greater fuel burning efficiencies. The optimum oxygen content of the mixture can be determined by routine testing.

Figure 1:
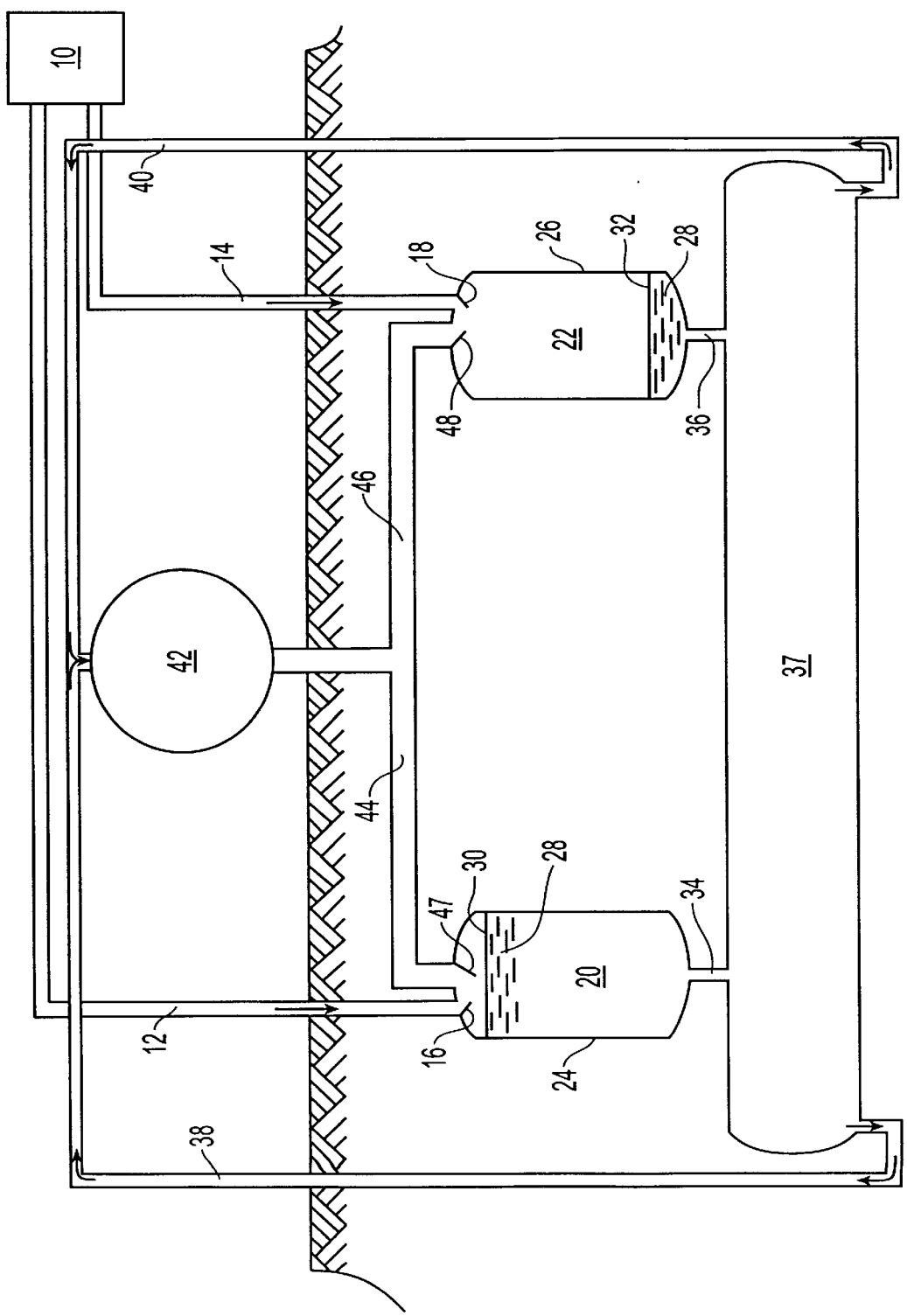
FIG. 1 is a cross-sectional view of a first embodiment of the present invention.

This embodiment of the invention is shown in FIG. 1, wherein there is an existing power plant 10, with pipes 12, 14, leading combustion products away from the power plant 10. The pipes are provided with valves 16, 18 at the entrance of the pipes 12, 14 to the cylindrical chambers 20, 22, which are enclosed by reinforced concrete 24, 26. Light weight vermiculite concrete is advantageously used, as it retains little heat.

The power plant can generate combustion products from any suitable fossil fuel which is made of hydrocarbon material, including coal, oil and/or natural gas. Fossil fuel is also defined in this application as including waste products of organic materials which can be burned to produce heat and combustion products. The term "combustion products" is used to include carbon oxides, such as carbon dioxide and carbon monoxide, steam or water vapor, and other gases. Nitrogen as well as nitrogen oxides are usually present and are included in the definition of this term.

Most of the heat in existing coal-fired boilers is transmitted to the boiler tubes by radiation and this invention teaches that increasing the oxygen content of the air now being used for combustion of the fuel will greatly increase flame temperature and hence radiation of heat to the boiler tubes. Such boilers have, since boilers were invented, used air to burn finely ground coal particles accompanied by finely ground ash particles. This produces a luminous flame which radiates heat to the steam boiler tube that line the walls of the steam boiler plant of a Public Utility. Temperatures reached in the luminous flame typically range from about 2200 to 3000 F. The invention allows higher temperatures to be achieved because conventional boilers use air, which is composed of about 20% oxygen and 80% nitrogen. By increasing the oxygen to 30%, i.e., increasing the oxygen volume by 10%, the volume of nitrogen is reduced to 70% and the oxygen/nitrogen ratio is increased to 30/70 or about 43% oxygen to burn the carbon and hydrogen of the fuel in a typical coal-fired electric power plant. The temperature is increased because the cooling effects due to dilution by the relatively large volume of nitrogen are reduced. There is an enormous value in oxygen enrichment of the air fed to steam boilers as increased temperatures of the flame can be almost directly converted to increased boiler tube temperatures.

On page 416 fourth edition of MARK'S HANDBOOK under the paragraph entitled "Steam Boiler Furnaces" the following is disclosed:

"For calculating heat transmission in the radiant sections of steam boiler furnace settings many empirical relations are available. One of the simplest is the Orrock-Hudson equation u=(1+(GvC/27 in which G is the weight ratio of air to fuel, C is the firing rate expressed as good bituminous coal per hour per square foot of exposed tube area (complete circumference if not buried in the wall)."

It is well known that power plants have been adding about 20% excess air to assure complete combustion of the pulverized coal. Just adding oxygen without the dilution effects of the large volume of nitrogen will enormously increase the flue gas temperature and ability to heat boiler tubes exposed to radiation.

The higher flame temperature is obtained at the expense of greater cost for utilizing higher oxygen in the gas. However, in the Fourth Edition Mechanical Engineer's Handbook (1941 page 353) it is disclosed that "With an expansion cylinder, 1 1b of liquid oxygen and 88 percent purity can be obtained from 0.77 hp-hr of work." Thus, the amount of work needed to create the increased amounts of oxygen necessary are more than offset by the higher temperatures and increased production of steam.

This invention teaches that the heat rate may be reduced to near theoretical and it has the great advantage that a truck or railroad car on which liquid oxygen which is between about 70% to 100% pure can be made from electricity at the site of the power plant and added to the power plant combustion air intake at gradually increasing amounts until it is determined the maximum coal saving has been determined. By reducing the amount of coal fired to make electric power this invention also reduces the quantity of air pollutants.

A reduction of up to about 50% the amount of coal fired in a coal-fired boiler commonly used in the production of electric power by Public Utilities can be obtained by merely enriching the oxygen content of the gas used for combustion thus increasing flame temperature. This occurs because the principal operating costs of coal include mining the coal, transporting it to a storage pile at the power plant, drying the coal, pulverizing it and firing it.

In one aspect of this embodiment, the combustion products are first generated conventionally, and are then introduced into a reservoir or tank to displace water therein. An important feature of the invention is that when a hydrocarbon fuel, such as, e.g., methane, is burned in air, the following general reaction takes place $$CH_4 + 2O_2 + N_2 \rightarrow CO_2 + 2H_2O + N_2.$$

Water is generally present as steam, and small amounts of CO, $NO_2$ and $NO_4$ are produced. The burning of a unit volume of the fuel produces a much larger volume of combustion products. It is these products that can be introduced into the tank to displace water from the tank and to the Pelton wheel.

In an alternate embodiment of the invention, a gaseous fossil fuel such as natural gas can be introduced into the top of the tank with the enhanced oxygen content gas and then combusted to form the relatively larger volume of combustion products in the tank. This volume of combustion products produces pressure on the water to force it out of the tank. A small space at the top of the tank is suitable to retain the fuel and gas for combustion.

A spark plug, piezoelectric ignition or other ignition source can be used to combust the fuel and gas mixture. This can be performed in a manner similar to that of an automobile internal combustion engine. When two tanks are used, the combustion of the mixture in one tank can force the water out into a second tank, while subsequently, the mixture in the second tank can be combusted to force the water back to the first tank. Of course, the hydro-electric device would be operatively associated with the tanks. For convenience, the device may be placed between the tanks.

The combustion of fuel in the tank will generate heat which will raise the temperature of the water before it exits the tank. This is advantageous because the viscosity of water is reduced at higher temperatures. For example, at 50° F., the viscosity of water is 1.308, at 68.4° F., it is 1.0, at 100° F. it is 0.679 and at 150° F., it is 0.432. Such reduced viscosity water increases the efficiency of the operation of a hydro-electric device such as a Pelton wheel. To retain heat within the tanks for transfer to the water, the tanks can be insulated.

Referring again to FIG. 1, inside the chambers 20, 22, there is water 28, and lightweight floats 30, 32 preferably made of fiberglass reinforced plastic. The floats 30, 32 can be used to keep the combustion products from blowing directly onto the water 28, but the process is operable even without the use of such floats. Alkaline material, such as sodium hydroxide or sodium carbonate, can be added to the water to render it slightly alkaline (i.e., a pH of about 7.5 to 9). This counteracts the effects of acidic components in the combustion products which may dissolve in the water and thus reduces corrosion of metallic equipment parts. The system can be a closed one to conserve the amounts of water to be used. Appropriate water treatment additives can be added for optimum operation. Corrosion inhibitors can be included to prevent corrosion of the metal parts of the hydro-electric apparatus.

As shown in FIG. 1, the case of floats 30, 32 is preferred. When float 30 is near the bottom of its stroke, float 32 will be near the top of its stroke so that a high pressure stream of water will flow through ducts 34, 36. Preferably a reinforced high pressure water storage tank 37 is provided. From the tank 37, the water flows through pipes 38, 40. The stream of water will act upon a Pelton wheel 42 or any acceptable turbine. The Pelton wheel 42 is preferably provided with a rotor and buckets. The stream of water rotates electric generators, and once spent flows down ducts 44, 46 back into chambers 20, 22, through valves 47, 48.

It is also incorporated into this disclosure that the tanks can be of any size, shape, or cross section. While cylindrical tanks would be the most efficient, rectangular, square or even spherical tanks can be used.

Figure 2:
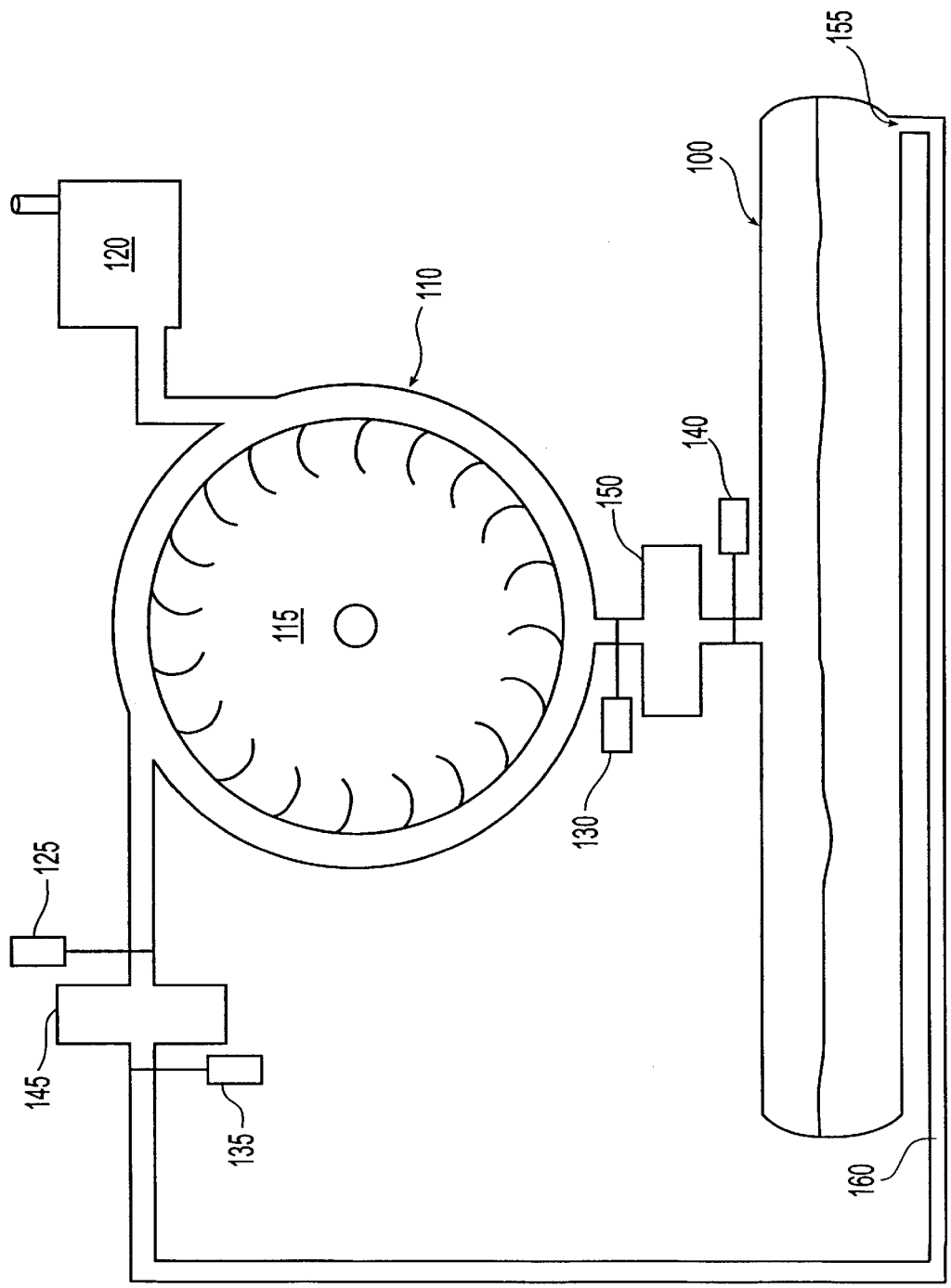
FIG. 2 is a cross-sectional view of a second embodiment of the present invention.

Another embodiment of the invention is illustrated in FIG. 2. Here, a reservoir 100 is used to hold water and is positioned and located at a lower elevation than the housing 110 which encloses a Pelton wheel 115 that can freely rotate therein. The Pelton wheel is connected conventionally to a rotating motor generator such that rotation of the Pelton wheel generates electricity. The housing is evacuated by vacuum device 120 so that a reduced pressure is below atmospheric is maintained therein. The housing 110 is hermetically sealed by sliding doors or gates 125, 130. A second set of sliding doors or gates 135, 140 are also provided. Gates 125, 135 and 130, 140 surround water reservoirs 145 and 150 respectively.

Operation of the system is described as follows. Doors 125, 130 are closed and housing 110 is evacuated. Thereafter, door 125 is opened, and water exits the reservoir 100 through exit hole 155. As explained above, exit hole 155 has a much smaller cross sectional area than the cross-sectional area of the reservoir 100. Water exiting the reservoir is drawn by suction through pipe 160 and into housing 110 for operation of the Pelton wheel. After rotating the Pelton wheel, the water drops to a lower portion of housing 110 where a drain is provided to allow the water to return to reservoir 100 by gravity.

In a further embodiment, the reduced pressure condition of the housing is maintained by including double sets of sliding doors on the housing where the water enters and exits. In addition, smaller reservoirs or tanks 145, 150 are provided. The operation of this embodiment is similar to that of the previous embodiment, except that gate 140 is closed while gates 125, 130 and 135 are opened. This enables water to enter housing 110, turn Pelton Wheel and then drop into reservoir 150. As reservoir 150 becomes full, doors 125 and 130 close. Door 140 can then open to allow the water to exit tank 150 and return to reservoir 100. At the same time, water exiting the reservoir can pass through gate 135 and into tank 145. If necessary, housing 110 can be further evacuated while gates 125 and 130 are closed. After water empties from tank 150, gates 125 and 130 are opened while gate 140 is closed and the process continues with water entering housing 110 from tank 145.

EXAMPLES

The following are exemplary illustrations of the processes of the present invention.

Example 1

To make use of the heat in the flue gas, this heat must be transferred from the flue gas to the water inside the tubes. The heat in a conventional flue gas (that is to be transferred) generated by burning a fuel in air is first estimated in Table I below. Flue gas temperature is assumed to be 370 F. entering the heat exchanger and 70 F. (i.e., the cooling water temperature) exiting the exchanger.

TABLE I

ESTIMATED
lbs flue gas per 1 lb Ziegler coal fired in Power Plant | MOLS OF GAS | | | *Btu/Mol (@370 F.–70 F.)/2 = 150 F. page 10 Principles Chem. Eng. Walker Lewis & McAdams

| | | | | | | |
|---|---|---|---|---|---|---|
| $N_2$ | 9.0175 | /mol wt 28 = | 0.3220 | × | *6.90 = | 2.1896 Btu |
| $CO_2$ | 2.5461 | /mol wt 44 = | 0.0579 | × | *9.90 = | 0.5732 Btu |
| $O_2$ | 0.5258 | /mol wt 32 = | 0.0164 | × | *6.80 = | 0.1115 Btu |
| $H_2O$ | 0.7483* | /mol wt 18 = | 0.0416 | × | *8.45 = | 0.3515 Btu (condenses @212 F.) |
| $SO_2$ | 0.0790 | /mol wt 64 = | 0.0012 | × | *9.90 = | 0.0119 Btu |
| | | | | | | 3.2377 Btu per lb flue gas |
| | 12.9167 lbs gas | | 0.4391 | | | 12.9167 × 3.2377 = 41.82 Btu/12.9167 gas |
| | | | | | | Flue Gas F. = 0.07742 Btu/lb gas cooling |
| | | | | | | (in out of heat exchanger) flue gas/lb coal |
| $H_2O$ | 0.7483*lbs @1000 Btu | | | | | 370–70 = 300 F. × 0.077422 = 23.22 Bto/lb gas |
| | Heat of Condensation = | | | | | from firing one lb Ziegler coal |
| | 748.3/12.9167 lbs gas | | | | | 57.71 Btu/lb gas |

The total heat recoverable from the heat exchanger is 80.93 Btu/lb gas from firing one pound of Ziegler coal from 370 F. to 70 F. Thus 80.93×12.9=1044 Btu The heating value of Ziegler Coal is 12,110/lb, so that 1044/12,110 or 8.6% of fuel is saved to heat water from 70 F. to 212 F. and make steam at 300 F. This calculation is 212−70=140×1 Btu/F.= 140 Btu/lb water+1000 Btu/lb evaporates+0.3515×(300− 212=31 F.)=45 Btu/lb water which totals 1171 Btu which is more than the 1044 recovered from the heat exchanger cooling one pound of gas from firing a pound of Ziegler coal. Thus, 1171/1044=1.12 pounds of Ziegler coal are needed to make steam at 300 F.

The addition of a greater volume of oxygen (compared to nitrogen) in the gas would lead to even greater values. For example, an increase of 120 F in flame temperature would lead to an increase of about 120 BTU (50×1 BTU/F.) to a total of about 1291. Thus, the amount of coal can be decreased by (1291−1171)/1171×100% or about 10%. This would reduce the amount of coal to achieve the same amount of steam by about 200 pounds for each ton that is currently burned to make steam at 300 F. Alternatively, the same amount of coal can be burned at the higher temperatures to generate about 10% more steam.

Example 2

A metal (which is preferably steel) water tank 400 inches in diameter and ten feet high has a 4 inch diameter outlet connected by 4-inch pipe to a Pelton Wheel hyrro-electric generator housed in an air-right room located a few feet higher than the top of said ten-foot high tank. The exit water from the air tight room returns by gravity in a 4-inch or larger pipe to the top of the ten-foot high tank which is not kept full of water but has an air space which near sea level locations could be 14 lbs/square inch air pressure (psia). The exit water from the 40-inch inside diameter water tank with 4-inch outlet will have 40×40/4×4×14 psia=1400 psia. Now 1400/14.7=95.2 times as great pressure and would need a high lake or reservoir without this invention.

The utility of the invention lies in its compact nature allowing it to be used to produce electricity for a building so cheaply that said building can be heated or cooled from the current produced.

This invention can be used on ships thus avoiding the cost of fuel. This invention may be used in cities and heavily populated locations where pollution of atmosphere is a problem.

What is claimed is:

1. A process for generating hydro-electric power which comprises:
    burning a fossil fuel in the presence of a gas that contains at least about 25% oxygen by volume to generate combustion products and higher temperatures compared to fuel burned in the presence of air;
    utilizing the combustion products to displace water in a reservoir and to cause the water to exit the reservoir; and
    directing the water exiting the reservoir to a hydro-electric apparatus for operation of the same to generate power.

2. The process of claim 1 wherein the gas contains at least 30% oxygen so as to increase the oxygen nitrogen ratio to at least about 43% and further increase the temperature of the combustion products.

3. The process of claim 2 wherein the gas contains at least 35 to 80% oxygen and which further comprises utilizing the increased temperature combustion products to create additional or higher temperature steam in power plant boilers.

4. The process of claim 1 which further comprises displacing water from the reservoir by generating the combustion products in the reservoir to displace the water and utilizing the increased heat to increase the temperature of the water in the reservoir.

5. The process of claim 4 wherein the reservoir is a first tank that includes a movable plate therein and which further comprises displacing the water by generating the combustion products in the tank to displace the plate.

6. The process of claim 5 which further comprises utilizing a second tank in the same manner as the first tank so that one tank can be refilled with water while the other is releasing water, wherein the water is directed back to one of the tanks while water is exiting the other tank.

7. The process of claim 4, which further comprises adding alkaline material and corrosion inhibitors to the water in the tank to prevent damage to the hydro-electric apparatus.

8. The process of claim 1 wherein the hydrocarbon fuel to be combusted is coal, oil or natural gas and water exits the reservoir through an aperture which has a relatively small area compared to the cross-sectional area of the reservoir.

9. The process of claim 1 which further comprises directing the exiting water to a second reservoir positioned at a higher elevation than the hydro-electric apparatus prior to directing the water to the hydro-electric apparatus.

10. The process of claim 1 wherein the hydro-electric apparatus comprises a Pelton wheel which is rotated to generate electricity.

11. The process of claim 10 wherein the hydro-electric apparatus produces direct current for charging one or more batteries.

12. A process for generating hydro-electric power which comprises:
   decreasing pressure within a housing containing a hydro-electric power generating apparatus;
   utilizing the difference in pressure between the housing and a water reservoir to cause the water to exit the reservoir and enter the housing, wherein the reduced pressure condition of the housing is maintained by a first pair of sliding doors where water enters into the housing and a second pair of sliding doors where the water exits the housing; and
   directing the water entering the housing to the hydro-electric apparatus for operation of same to create hydro-electric power;
   wherein the first pair of sliding doors alternatively slide open and close in order to allow passage of water into the housing while preserving the pressure difference between the reservoir and the housing and the second pair of sliding doors alternatively slide open and close in order to allow passage of water from the housing while preserving the pressure difference between the reservoir and the housing.

13. The process of claim 12 wherein the water exits the reservoir through an aperture which has a relatively small cross-sectional area compared to the cross-sectional area of the reservoir.

14. The process of claim 12 wherein the hydro-electric apparatus comprises a Pelton wheel which is rotated to generate electricity.

15. The process of claim 12 wherein one of the doors remains closed while the other door is open in order to preserve the difference in pressure between the reservoir and housing.

16. The process of claim 12 which further comprises directing water exiting from the hydro-electric apparatus back to the reservoir.

17. The process of claim 16 wherein the housing containing the hydro-electric apparatus is located at a higher elevation than the reservoir.

18. The process of claim 12 wherein one of the doors remains closed while the other door is open in order to preserve the difference in pressure between the reservoir and housing.

19. A process for generating hydro-electric power which comprises:
   burning a fossil fuel in the presence of a gas that contains at least about 25% oxygen by volume to generate combustion products and higher temperatures compared to fuel burned in the presence of air;
   generating the combustion products in a first reservoir to displace water therefrom and cause the first water;
   utilizing the higher temperatures from the combustion product generating step to increase the temperature of the water in the first reservoir; and
   directing the water exiting the first reservoir to a second reservoir prior to directing the water to a hydro-electric apparatus for operation of the same to generate power;
   wherein the second reservoir is positioned at a higher elevation than the hydro-electric apparatus.

20. The process of claim 19 wherein the hydro-electric apparatus comprises a Pelton wheel which is rotated to generate electricity, the hydrocarbon fuel to be combusted is coal, oil or natural gas, and the water exits the first reservoir through an aperture which has a relatively small area compared to the cross-sectional area of the first reservoir.

* * * * *